Figure 1:
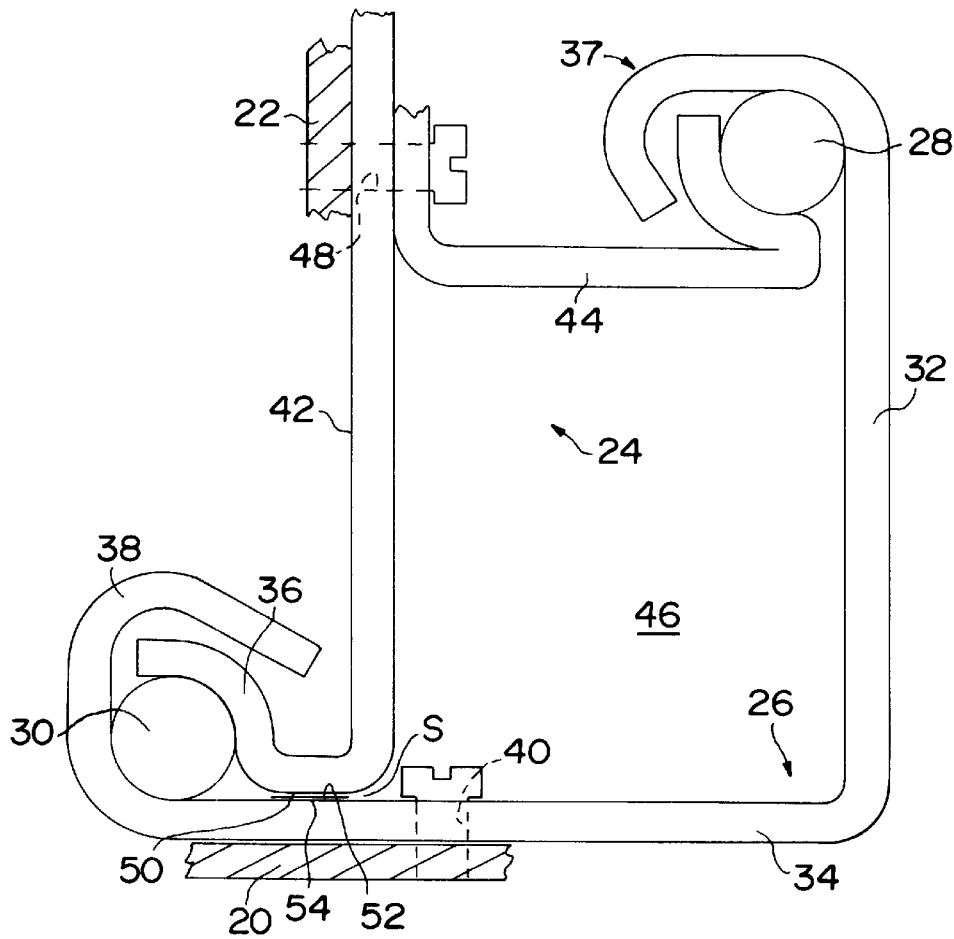

United States Patent
Bauer et al.

[19]

[11] Patent Number: 5,941,495
[45] Date of Patent: *Aug. 24, 1999

[54] LONGITUDINAL GUIDE FOR A MOTOR VEHICLE SEAT WITH TWO RAILS AND GUIDING DEVICES ARRANGED BETWEEN THEM

[75] Inventors: Heinz Bauer; Burckhard Becker; Ernst-Reiner Frohnhaus, all of Solingen, Germany

[73] Assignee: C. Rob. Hammerstein GmbH & Co., Solingen, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/665,870

[22] Filed: Jun. 19, 1996

[30] Foreign Application Priority Data

Jun. 19, 1995 [DE] Germany ............... 195 21 566

[51] Int. Cl.⁶ ............... F16M 13/00; A47C 1/02
[52] U.S. Cl. ............... 248/430; 248/419; 297/331
[58] Field of Search ............... 248/429, 430, 248/419, 421, 331, 344.1

[56] References Cited

U.S. PATENT DOCUMENTS

| | | | |
|---|---|---|---|
| 4,756,503 | 7/1988 | Fujita ............... | 248/430 |
| 4,969,622 | 11/1990 | Münchow et al. ............... | 248/429 |
| 5,076,530 | 12/1991 | Dove et al. ............... | 248/430 |
| 5,322,348 | 6/1994 | Johnson et al. ............... | 248/430 |
| 5,350,148 | 9/1994 | Yamamura ............... | 248/430 |
| 5,516,071 | 5/1996 | Miyauchi ............... | 248/430 |

FOREIGN PATENT DOCUMENTS 3143431  5/1983  Germany .

Primary Examiner—Charles A Marmor
Assistant Examiner—Matthew A. Kaness
Attorney, Agent, or Firm—Eckert Seamans Cherin & Mellott, LLC

[57] ABSTRACT

A longitudinal guide apparatus for a motor vehicle seat having two rails for slidably supporting the motor vehicle seat for fore-aft position adjustment. The guide apparatus includes first fixation devices arranged at one of the two rails for fixing one rail to the motor vehicle seat. Second fixation devices are arranged at the other of the two rails connecting the other rail to a platform of a motor vehicle. Guiding devices are arranged between the two rails. Each rail is provided with at least one hooked part which is in reciprocal engagement with the hooked part of the other rail. One of the two rails is formed as an encompassed rail, the other rail being formed as an encompassing rail, the encompassing rail encompassing the encompassed rail wherein each of the two rails is equipped with a sliding section. The sliding section of one rail faces the sliding section of the other rail, and the rails are manufactured in such a way that in a first, unloaded state of the motor vehicle seat supported by the longitudinal guiding device there is a gap between the two sliding sections, whereas in a second, loaded state, when a load above a threshold value is placed on the motor vehicle seat, the rails deform so that the sliding sections contact and directly transfer forces from one rail to the other rail.

12 Claims, 2 Drawing Sheets

LONGITUDINAL GUIDE FOR A MOTOR VEHICLE SEAT WITH TWO RAILS AND GUIDING DEVICES ARRANGED BETWEEN THEM

The invention relates to a longitudinal guide for a motor vehicle seat with two rails and arranged between them guiding devices, of which one rail is equipped with fixing devices for fitting to the motor vehicle seat and the other rail being equipped with fixing devices for its connection with a platform of a motor vehicle, whereby one rail is an encompassed rail and which is being encompassed by the other encompassing rail and each rail showing at least one hooked part which is in reciprocal engagement with the hooked part of the other rail.

Longitudinal guides of the above mentioned kind are known from P31 43 431.2. In pofile the rails known essentially consist of two sides—running towards each other in a right angle-, which at their final sections gradually change into hooked parts. These are modelled bent or buckled in a U-shape and they reciprocally engage towards an according U-shaped part (hooked part) of the other rail. By this a reciprocal interlocking is achieved. In the direct vicinity of the hooked parts the guiding devices are arranged, which are shaped mostly as balls. The encompassing rail shows an elastic prestress, it is resilient towards the inside, the same applies to the encompassed rail, it is resilient towards the outside. This way the guiding devices are kept close to the guiding flanges.

The longitudinal guide known is suitable to transfer the strong forces of the safety belts, which can occur in an accident, without tearing like a zipper or in any other way. This firmness is shown in all relative positions of the two rails towards each other, which are possible in the given adjusting way of the longitudinal guide.

The longitudinal guide can be made of a light metal, i.e. aluminium and then especially in the extrusion moulding method, or it can be made from a sheet steel blank by appropriate shaping, especially tangent-bending or imprinting.

It is the aim in the course of lightweight construction to reduce the weight of longitudinal guides. This reduction in weight should not go along with a reduction in comfort and especially not with a reduction in safety. It is therefore desired to model the known longitudinal guide with less weight without having to accept essentiel disadvantages, especially the fact that safety against tearing like a zipper or any other way of separating the rails is sufficiently kept and that a longitudinal adjustment between the two rails can furthermore occur with minor expenditure of force.

Accordingly, it is the task of the invention to develop the longitudinal guide of the above mentioned kind in such a way that it is built light-weightedly by being able to reduce the diameter of the material, without having to accept disadvantages concerning safety or functionality.

This task is solved by the longitudinal guide according to patent claim 1 based on the longitudinal guide of the above mentioned kind.

This longitudinal guide offers the possibility to make the rails out of much thinner material than according to the state of art. According to the invention the material does not have to be chosen of such thickness that the longitudinal guide transfers pressure due to the weight of a passenger or something similar exclusively via the two guiding devices into the guiding parts, instead an additional support occurs via the sliding sections, but no additional guide. The construction of the rails is thereby simplified insofar as the pressure of weight is taken into account. Therefore, when constructing the rails the focus can be put on resistance to tear-out, meaning resistance in the counter-direction of a pressure of weight and the rails can be designed in such a way that even with thinner material used for the rail sections a sufficient resistance to tear-out is achieved.

When balls are used as guiding devices, which is actually preferred, then these balls can be chosen of a smaller size, as the weight forces are now not transferred by them exclusively but also via the sliding sections. Concerning the resistance to tear-out the possibility of being able to use smaller balls has appeared to have a positive effect as these use up less space in the guiding part and therefore the interlocking of the guiding flanges can occur more narrowly, namely by using up less space.

According to the invention the good guiding characteristics of the longitudinal guide are kept. The sliding sections solely have the effect of transfer of weight in the case of heavy weights, but they do not have a guiding effect. Due to the two guiding devices arranged in the guiding sections the longitudinal guide is uniquely defined, it is secured that the guiding devices are always in arrangement, even when the rails are being deflected, show production-based allowances, the two longitudinal guides of a motor vehicle seat are not assembled parallel towards each other and soforth. The condition being that the prestress with which the rails are arranged next to each other is chosen sufficiently high. That is why the guiding devices achieve an exact guide of the rails towards each other with the longitudinal guide according to the invention and the sliding sections take over forces, which occur above a threshold value (i.e. 50 kg) of the pressure of the longitudinal guide due to the weight without creating additional guiding devices by the sliding sections, which then come into competition with the guides being effected by the two guiding devices. The weight of a normal passenger is rated at 80 kg.

The longitudinal guide is secured against overstress by the sliding sections, this is especially advantageous, if in a preferred embodiment at least one guiding device is modelled with balls, preferably both. The sliding sections secure that the balls cannot be pressured above the threshold value, i.e. above a pressure of weight of 50 kg, the transfer of power rather takes over forces of weight by the sliding sections above. Due to that, engravings, so-called brinells, of the balls in their tracks when overloading do not occur any more. Such overloading has to be taken into account, if a passenger flattens his coat behind his back, lifts himself up from his seat and presses against the back rest with his back.

After all the space between the two rails, which can also be called the inner space of a channel, can be modelled free from guiding devices or other parts of the longitudinal guide and is then available for the fitting of a motoric drive, i.e. a toothed rack and a pinion or a locking device for manual locking.

Preferably, the guiding devices are still at the biggest distance possible from each other, that means preferably on a diagonal of the rail profiles, which in a preferred embodiment can be described as essentially rectangular with interlocking sections on the inside and on the outside. Due to the relatively big distances of the guiding devices from each other a sufficiently big support bases is kept. This means that the one rail is guided well into the other and that relative movements on the level of the diameter of the profile, i.e. a tilting of the one rail against the other is effectively obstructed and is only possible in the course of elastic and (with progressive pressure) plastic deformations.

In a preferred embodiment the sliding sections are directly placed beneath the fixing devices via which the seat rail is connected with the motor vehicle seat and/or above the fixing devices, with which the platform rail is connected with the platform of a motor vehicle. That way the forces of weight are taken up directly via the sliding sections. It is thereby preferred that the fixing devices are connected directly and possibly without diversion to a side of a rail, which runs vertically and in whose vicinity the sliding section of the matching rail is placed.

It has proven to be especially advantageous to arrange the sliding sections of at least one rail directly close to a guiding section, i.e. to connect directly with a guiding flange. That way the traverse movements traverse to the direction of movement, which the two sliding sections of a longitudinal guide carry out when being adjusted, become relatively small. Expressed differently the spacial allocation of the two rails towards each other effected in the observed guiding section achieves that this spacial allocation stays as well as possible in the section of the sliding sections also and the two sliding sections do not move noticeably in traverse towards each other in practical use.

The sliding sections only serve a supportive but not a guiding function. It is advantageous to arrange devices between the two sliding sections, which reduce friction, i.e. lubrication, a sliding bearing or an arrangement of small balls. It needs to be secured that the sliding sections cannot only slide against each other in the longitudinal direction of the rails, which would be essential for functioning, but also slightly traverse to it, namely seen in the profile of the longitudinal guide along the line of contact of the two sliding sections.

Preferably the two sliding sections run on a level in a right angle to the direction of pressure with which the forces of weight affect the longitudinal guide. That way pressure does not lead to a traversal shifting of the sliding sections of the two rails.

It has further proven to be advantageous to design the sliding sections plane in their sections of contact. All other designs would lead to an additional guide in the part of the sliding sections as soon as these will have contact with each other.

Further advantages and characteristics of the invention result from the respective claims and the following illustration of a non restrictive embodiment of the invention, which will be explained with reference to the accompanying drawing. The drawing shows in:

FIG. 1: A front view of a longitudinal guide according to the invention in a first embodiment and FIG. 2: a front view of a second embodiment of the invention.

Figure 3:
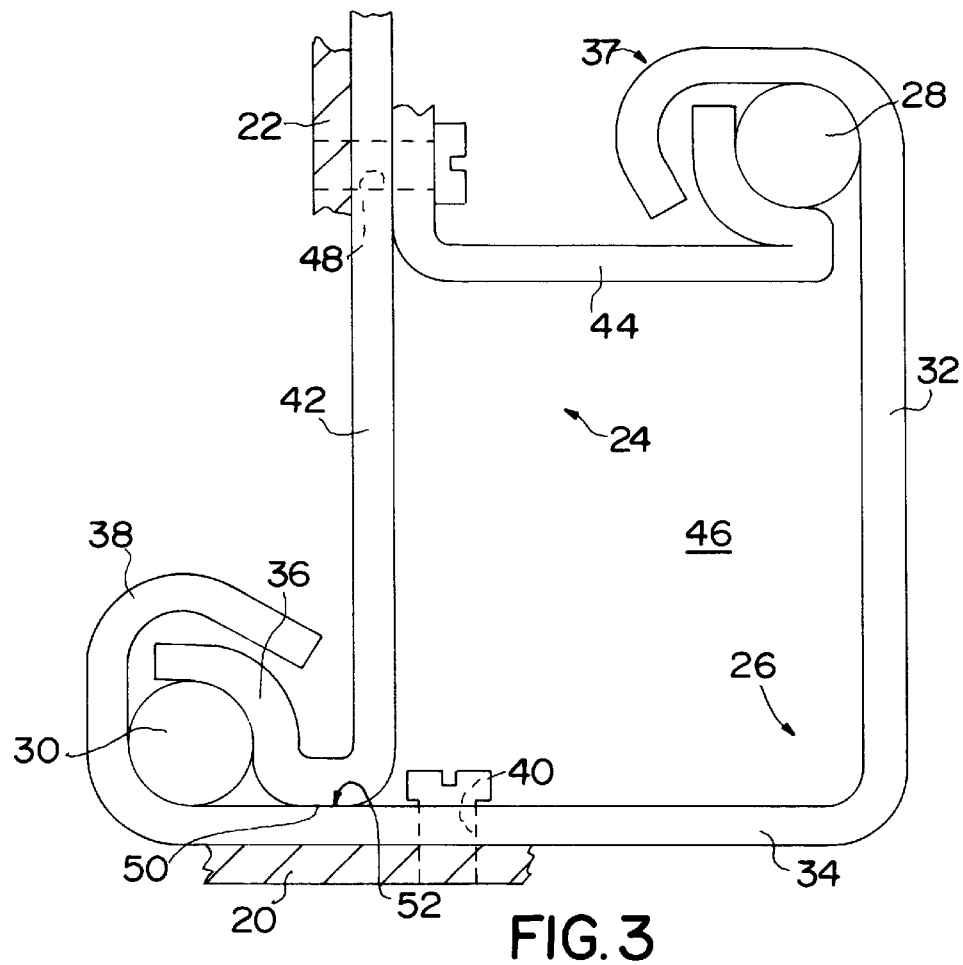

FIG. 3: A front view of a longitudinal guide showing the sliding sections of the two rails contact with each other during a loaded state according to the embodiment shown in FIG. 1.

Figure 4:
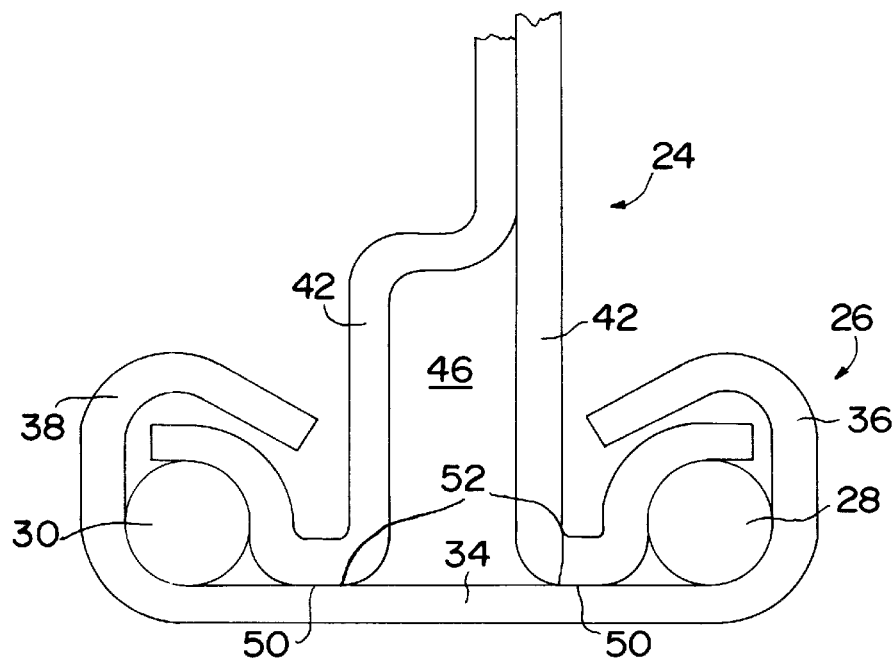

FIG. 4: A front view of a longitudinal guide showing the sliding sections of the two rails in contact with each other during a loaded state according to the embodiment shown in FIG. 2.

In the manner known a seat adjustment is planned for the device for seat adjustment of the motor vehicle seat, it consists of two longitudinal guides arranged parallel towards each other in the normal direction of transport of the motor vehicle and in a distance from each other. One of the longitudinal guides is shown in one of the illustrations. It is placed between a platform 20 of which in FIG. 1 a part, i.e. a part of a console is shown, and of a motor vehicle seat 22 of which FIG. 1 shows a part of a seat support.

Each longitudinal guide consists of two rails 24, 26 namely a seat rail 24 and a platform rail 26. Between them two guiding devices 28,30 are placed, which in the two embodiments shown are formed each by a set of balls, arranged behind each other and of which, therefore, only one is to be seen in the illustrations. In a further embodiment not shown lubrication, i.e. gliding bars, gliding tubes, surfaces of contact of the rails, gliding on each other and others can be used. According to the state of art sufficient examples for this exist.

In the embodiments the platform rail 26 is designed as an emcopassing rail, it encompasses the seat rail 24 partly placed inside it. Through that an elastic prestress exists between the two rails 24,26, which operates along the connecting axis of the guiding devices 28,30 and in the illustration shown keeps this to the two rails 24,26. According to FIG. 1 the platform rail 26 is designed in such a way that it is resilient to the inside along the connecting line, but the seat rail 24 may also be designed resilient to the outside accordingly, also the two rails 24, 26 can be elastically prestressed in opposite direction towards each other.

The platform rail is essentially V-shaped, it has two sides 32,34 being towards each other in a right angle. At its free end hooked parts 36,37,38 are planned, which form an essentially U-shaped hook together with the according end of the sides 32,34. Holes 40 are planned in the parallel side 34 to the platform 20. These holes 40 are punched through by a screw and serve as fixing devices for connecting the platform rail 26 to the platform 20.

The seat rail 24 is constituted of two individual profiles, which are connected with each other. It also has a side 42, 44 each which runs parallel to the according side of the platform rail 26. Becuase of this a tubular, longish inner hollow space is formed, also called inner space of a channel 46. At their free ends the sides 42, 44 change into hooked parts, they also form U- or V-shaped ends together with the final sections of the sides 42,44 and are reciprocally hooked with each of the matching hooks of the other rail. By this two interlocking sections are created which are arranged in the embodiment according to FIG. 1 on a diagonal of the profile, which can generally be described as being essentially of right angular shape. The interlocking in the interlocking sections can be reinforced by the free ends of the rail profiles engaging further into each other by projecting further into the inner space of the U-shaped hook. In the two embodiments shown the seat rail 24 is made of two individual blanks of steel plates. It can also be made in one piece from light metal. The seat rail 24 can further be made as one piece from only one sheet metal blank, this is illustrated in FIG. 1 with a dotted line.

Also the seat rail 24 has holes 48, which are punched through by screws and serve as fixing devices of the seat rail at the motor vehicle seat 22. In the illustrations of the two figures also showing the orientation of the longitudinal guide in the state of fitting these fixing devices are placed perpendicularly above the sliding sections 50, 52. The sliding section 50 is placed directly to the outside of the hook, which is formed by the final section of the side 42 and the matching hooked part 36. The sliding section 52 of the platform rail is placed in the direct vicinity of the transition between the side 34 and the matching hooked part 38. As both figures show, in the illustrated unpressured state of the longitudinal guide the sliding sections have a small distance from each other, which is remarkably smaller than the diameter of the balls used and practically smaller than 2 mm, preferably smaller than 1 mm. The sliding sections are plane, stretch out in the longitudinal direction of the rails 24, 26 and essentially in a right angle to the initiated forces of weight and essentially parallel to the platform 20. The construction is chosen in such a way, that no sideward shiftings are supposed to occur under pressure, rather the sliding sections and essentially only the vertical factors of a force of weight take up.

Between the two sliding sections 50, 52 there is a lubricant 54 only hinted at in FIG. 1. Here grease can be used, but stripes or applications made from hard lubricants are preferred for example synthetic ribbons, i.e. Teflon-stripes, metal stabs, portions of coal and soforth.

Pressures of weight of the longitudinal guide up to a threshold value, for example 50 kg for the two longitudinal guides of a motor vehicle seat, are taken up exclusively by the guiding devices 28, 30, the sliding sections 50, 52 stay out of contact, the gap S between them stays intact. Above the threshold value, however, the elastic deformation of the two rails 24, 26 has progressed so far that the sliding sections 50, 52 get into contact with each other and shares of the weight above the threshold value are taken up by them. Because of that the pressure occurring in the guiding devices 28, 30 is limited to the threshold value, namely a share of the threshold value. The guiding devices 28, 30, preferably designed as balls, can therefore be designed much smaller, for example the balls may only have 70, preferably only 50 or even 40% of the diameter of the balls used up to date. According to that the hooked parts can also be designed smaller, another reason being the thinner substance of the rails.

Figure 2:
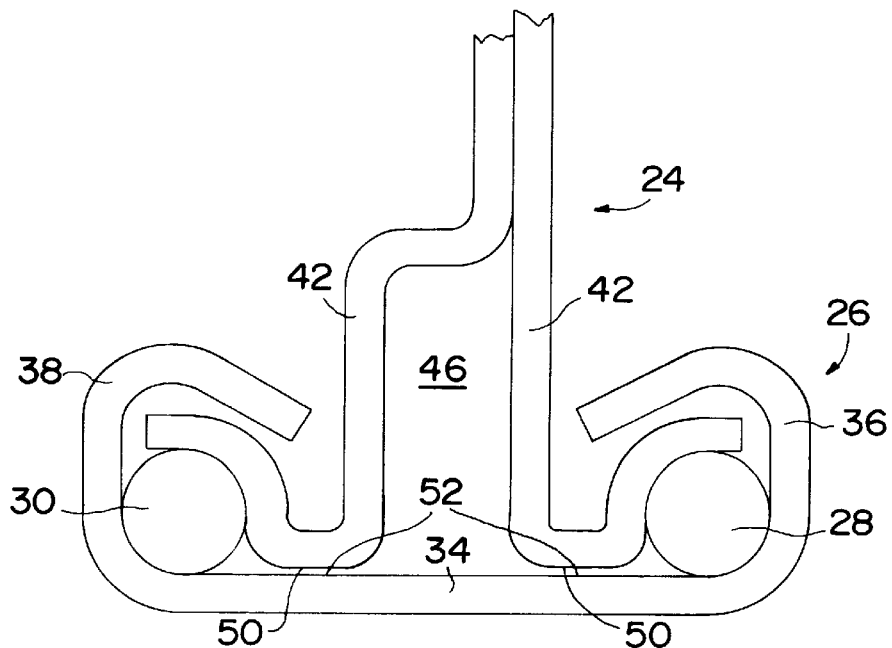

The embodiment according to FIG. 2 has already been discussed in general. There the difference lies in the platform rail 26 being essentially C-shaped, resembling a flat C. It only has one side 34, which runs parallel to the platform 20, at both of its ends the hooked parts 36, 37, 38 start. Due to that two hooks are formed, whose openings face towards each other. Again, the seat rail 24 is put together of two pieces of profile, but may also be made from steel plates or light metal of one piece as mentioned before. In the embodiment according to FIG. 2 the two pieces of profile are different, but may also be of identical design. The parallel displacement (the right angle bend) of the left part of the profile is not essential for the function on one hand, and can be left out on the other, if there is no need for an inner space of the channel 46. Furthermore both parts of the profile may show an according right angle bend then only having the effect of half the displacement. Finally the right angle bend may be dispensed with completely, if the two parts of the profile are kept in distance from each other by suitable fixing devices, for example screws. The last embodiment having the advantage that parts of a seat adjustment in height, a motoric drive and so on can be securely arranged between the two parts of the profile of the seat rail 24, that way allowing far more space upwards than with the inner space of the channel 46 of the embodiment according to FIG. 1.

The embodiment according to FIG. 2 shows two pairs of sliding sections 50, 52 each, which again are placed essentially beneath the spot where the pressure of weight acts upon. The sliding sections 50, 52 are designed in a similar way as in the embodiment according to FIG. 1. Due to the two independent pairs of sliding sections 50, 52 tilting forces can be caught up better without overstressing the guiding devices 28, 30.

In all embodiments the sliding sections are close to the power vector, with which the pressure of weight acts. They show a height of 40 mm at the most, preferably 20 mm at the most displaced sideways (on the level of profile of the longitudinal guide) opposite the power vector. A certain movement of the sliding sections in this traverse direction is possible, but not intentional. The deformation of the rails excluding pressure caused by accidents should be purely elastical, this applies especially to deformations of the rails between the released and pressured state shown in the illustrations. The weight of a passenger is normally distributed evenly on both longitudinal guides of a device for seat adjustment of a motor vehicle seat. The case may occur though that with a longitudinal guide a lower threshold value is planned where the sliding sections 50, 52 get into contact with each other than with another longitudinal guide of the same device for seat adjustment. In general, both longitudinal guides are designed for the same threshold value.

We claim:

1. A longitudinal guide device for mounting a seat inside a motor vehicle, comprising:

a first elastically deformable rail and a second elastically deformable rail on which the seat is slidably supported so that the seat can be adjusted in a fore-aft direction;

first fixation devices arranged at the first rail for fixing said first rail to the seat;

second fixation devices arranged at the second rail connecting said second rail to a platform of a motor vehicle;

guiding devices arranged between the first rail and the second rail;

said first rail and second rail each having at least one hooked part arranged there along, the at least one hooked part having an inner circumference and the first rail and second rail being arranged relative to each other so that the inner circumference of the at least one hooked part of the first rail faces the inner circumference of the at least one hooked part of the second rail;

one of the two rails being formed as an encompassed rail, the other of said two rails being formed as an encompassing rail, the encompassing rail encompassing the encompassed rail wherein each of the two rails is equipped with a sliding section, the sliding section of one rail faces the sliding section of the other rail wherein in a first, initial state wherein a load applied between the rails is below a threshold value, the rails are spaced apart by and supported by the longitudinal guiding device and there is a gap between the two sliding sections, whereas in a second state, when the load applied between the rails is above the threshold value, elastic deformation in at least one of the two rails brings the sliding sections into contact so that the sliding sections support the load, said threshold value corresponding to a weight of a passenger, whereby the guide device can sliding support an empty seat and fixedly support a seat occupied by the passenger.

2. Longitudinal guide device as set forth in claim 1, wherein the first rail and the second rail each have a longitudinal direction and the sliding section of each rail extends in the longitudinal direction of the rails.

3. Longitudinal guide device as set forth in claim 1, wherein at least one sliding section is arranged close to an adjacent sliding section.

4. Longitudinal guide device as set forth in claim 3, wherein one rail is positioned relative to the other rail so that each sliding section separated a distance which is less than a third of a width of the first rail.

5. Longitudinal guide device as set forth in claim 3, wherein the guiding device comprises balls and sliding section is arranged at a distance from the center of the balls of at least less than three times the diameter of the balls.

6. Longitudinal guide device as set forth in claim 1 wherein the sliding sections essentially run parallel to the platform.

7. Longitudinal guide device as set forth in claim 1, wherein the second rail is a platform rail and is formed as an encompassing rail and the sliding section of the platform rail is placed on a side of the section of this platform rail, which runs parallel to the platform.

8. Longitudinal guide device as set forth in claim 1, wherein the sliding section of the first rail, which is equipped with the first fixation devices, is placed in substantially vertical orientation relative to the first fixation devices.

9. Longitudinal guide device as set forth in claim 1, wherein a lubricant or grease is placed between the two sliding sections of the rails.

10. Longitudinal guide device as set forth in claim 1, wherein the first rail has two sides running towards each other at a substantially right angle, which form hooked parts showing a V- or U-shaped at their free ends.

11. Longitudinal guide device as set forth in claim 10, wherein the hooked parts have one of V-shape and U-shape.

12. Longitudinal guide device as set forth in claim 1, wherein the sliding sections are substantially planar and extend along more than half the entire length of the rail.

* * * * *